(12) United States Patent
Chang et al.

(10) Patent No.: US 10,328,943 B2
(45) Date of Patent: Jun. 25, 2019

(54) INTEGRATED CONTROL METHOD FOR ENGINE AND TRANSMISSION

(71) Applicants: HYUNDAI MOTOR COMPANY, Seoul (KR); KIA MOTORS CORPORATION, Seoul (KR)

(72) Inventors: Woo Il Chang, Hwaseong-si (KR); Joon Bae Kim, Seongnam-si (KR); Chan Hee Won, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/796,347

(22) Filed: Oct. 27, 2017

(65) Prior Publication Data

US 2018/0273038 A1    Sep. 27, 2018

(30) Foreign Application Priority Data

Mar. 24, 2017    (KR) .................. 10-2017-0037818

(51) Int. Cl.
*B60W 30/188*   (2012.01)
*B60W 10/06*    (2006.01)
*B60W 10/107*   (2012.01)
*B60W 50/00*    (2006.01)

(52) U.S. Cl.
CPC ........ *B60W 30/1882* (2013.01); *B60W 10/06* (2013.01); *B60W 10/107* (2013.01); *B60W 50/00* (2013.01); *B60W 2050/0026* (2013.01); *B60W 2520/10* (2013.01); *B60W 2540/10* (2013.01); *B60W 2710/0644* (2013.01); *B60W 2710/0666* (2013.01); *B60W 2710/1005* (2013.01)

(58) Field of Classification Search
CPC ........ B60W 10/06; B60W 10/10–115; B60W 30/1882; B60W 2050/0026
See application file for complete search history.

(56) References Cited

U.S. PATENT DOCUMENTS 6,389,348 B1 * 5/2002 Takagi .................. B60K 6/543
                                                    701/51
7,185,641 B2 * 3/2007 Suzuki ................ F02D 41/0002
                                                    123/520

FOREIGN PATENT DOCUMENTS

JP          4018786 B2    12/2007
JP          5264091 B2     8/2013
KR         10-0630593      9/2006

* cited by examiner

*Primary Examiner* — Erin D Bishop
(74) *Attorney, Agent, or Firm* — Brinks Gilson & Lione

(57) ABSTRACT

An integrated control method is provided for an engine and a transmission and the method is capable of integrally controlling the engine and the transmission, based on a control correlation between the engine and the transmission. This method determines a target engine operating point reflecting a driving state of a vehicle and a driver's intention to accelerate, in an integrated control map having an engine control area and a transmission control area. The method calculates a target shift ratio based on the target engine operating point, thus being capable of significantly saving a man-hour required to set a map as compared to a conventional control method in which an engine torque map and a shift pattern map are individually set, and improving fuel efficiency.

4 Claims, 3 Drawing Sheets

INTEGRATED CONTROL METHOD FOR ENGINE AND TRANSMISSION

CROSS REFERENCE TO RELATED APPLICATION

This application claims priority to and the benefit of Korean Patent Application No. 10-2017-0037818, filed on Mar. 24, 2017, which is incorporated herein by reference in its entirety.

FIELD

The present disclosure relates to an integrated control method for an engine and a transmission.

BACKGROUND

The statements in this section merely provide background information related to the present disclosure and may not constitute prior art.

Generally, an engine is controlled by setting an engine torque map, and a transmission is controlled by setting a shift pattern map.

Thus, the engine torque map and the shift pattern map are independently developed, and likewise the engine and the transmission are independently controlled.

Depending on a vehicle state and a driver's intention, the engine and the transmission are individually controlled. Thus, the related art is problematic in that it is difficult to effectively control the engine and the transmission.

That is, since the engine torque map and the shift pattern map are respectively controlled without taking into account the operating conditions of the engine and the transmission, two maps should be independently set to match actual acceleration/deceleration/driving strategy of a vehicle.

Thus, it is difficult to effectively control fuel efficiency taking into account the vehicle state for an overall operating area of the vehicle. Further, an unintended inconsistent control such as the lack of acceleration/the excess of acceleration may occur.

Moreover, a lot of man-hours are undesirably required to set a pattern map that affects the behavior, the fuel efficiency of the vehicle and the like.

The foregoing is intended merely to aid in the understanding of the background of the present disclosure, and is not intended to mean that the present disclosure falls within the purview of the related art that is already known to those skilled in the art.

SUMMARY

The present disclosure addresses the above problems occurring in the related art, and proposes an integrated control method for an engine and a transmission, which is capable of integrally controlling the engine and the transmission, based on a control correlation between the engine and the transmission.

According to one aspect, an integrated control method for an engine and a transmission includes: a required-power calculation step of calculating, by a control unit, a required power of a vehicle based on factors reflecting a driving state of the vehicle; an engine-operating-point calculation step of calculating, by the control unit, a target engine torque and a target engine revolution per minute (RPM) that are needed to output the required power corresponding to a driver's intention to accelerate; a shift-ratio calculation step of calculating, by the control unit, a target shift ratio based on a relationship between the target engine RPM and a vehicle speed; and an integrated control step of controlling the engine and the transmission by the control unit such that a current engine torque, a current engine RPM, and a current shift ratio come close to the target engine torque, the target engine RPM, and the target shift ratio.

The factors reflecting the driving state of the vehicle in the required-power calculation step may include the vehicle speed, a gradient, and an accelerator position sensor (APS) opening amount.

In the engine-operating-point calculation step, a permissible engine torque range may be determined by obtaining a minimum value and a maximum value for the engine torque that may output the required power, on an equivalent power curve determined based on the driver's intention to accelerate, and the target engine torque may be determined within a range of the permissible engine torque based on a driver's acceleration level.

In the shift-ratio calculation step, an engine torque map is configured to establish a relationship between an engine RPM and an engine torque, and a shift pattern map is configured to establish a relationship between a RPM of a driving shaft pulley and a RPM of a driven shaft pulley. In particular, the RPM of a driving shaft pulley may be defined as an approximate value of the engine RPM for the engine torque map and the shift pattern map, and the RPM of the driven shaft pulley may be defined as an approximate value of the vehicle speed, so that the target shift ratio may be determined based on the relationship between the RPM of the driving shaft pulley and the RPM of the driven shaft pulley.

In the shift-ratio calculation step, a permissible shift ratio range may be determined by obtaining a minimum value and a maximum value for the engine RPM that may output the required power, on an equivalent power curve determined based on the driver's intention to accelerate, and the target engine RPM may be determined within a range of the permissible shift ratio.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
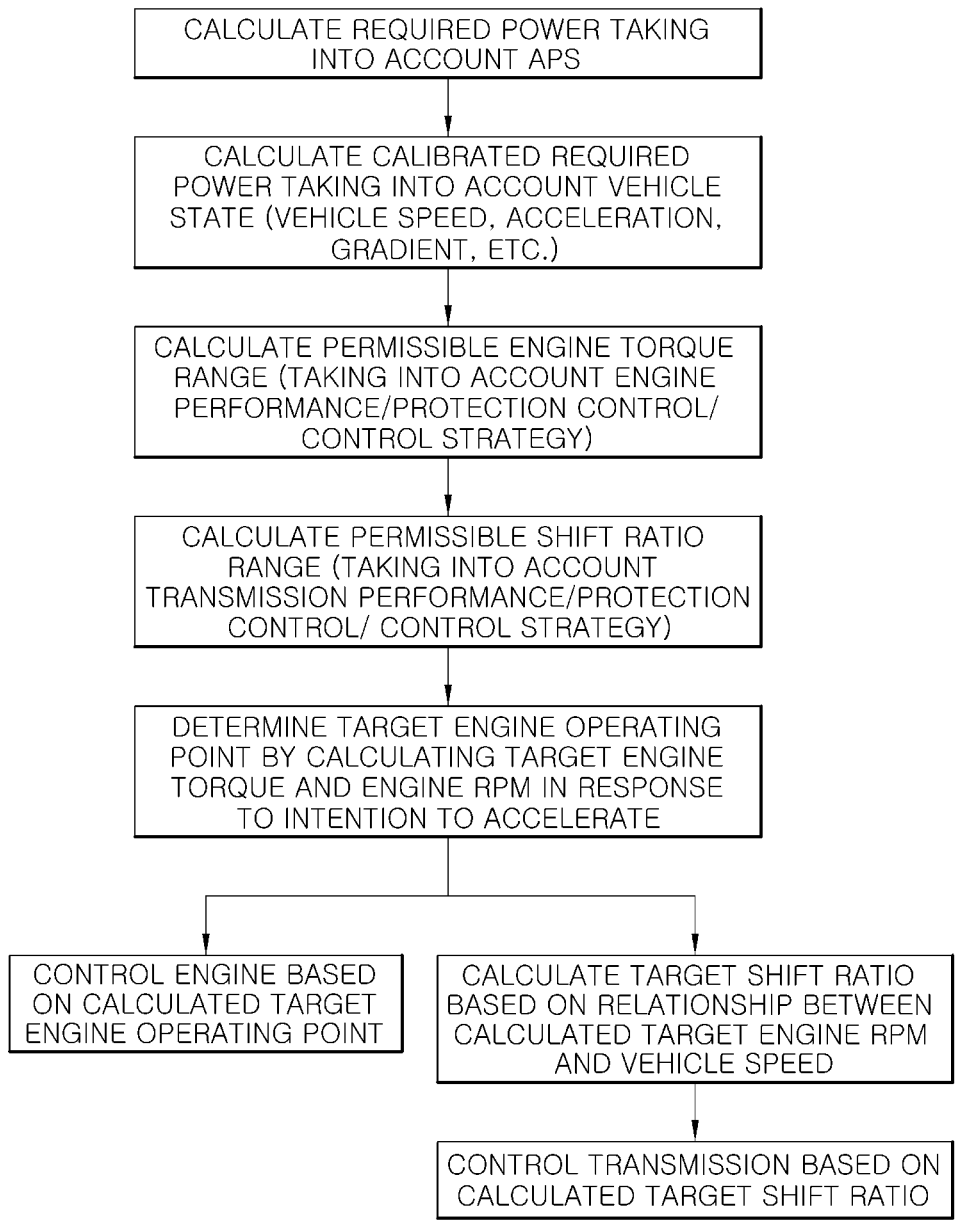
FIG. 1 is a control flowchart illustrating an integrated control method for an engine and a transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An integrated control method for an engine and a transmission according to the present disclosure may be applied to a vehicle, which is driven by a driving force of the engine and is equipped with a torque converter and a continuously variable transmission. The method is configured on the premise that there are control correlations between output values utilized for controlling the engine, between output values utilized for controlling the transmission, and between output values utilized for controlling the engine and the transmission, among output values reflecting a driving state of the vehicle.

The control correlation factors will be described in detail. First, in a state where a damper clutch of a torque converter is engaged, an engine RPM (Ne), a turbine RPM (Nt) of the torque converter, and a driving-shaft pulley RPM (Np) are defined as having approximate values as follows:

$$Ne \approx Nt \approx Np$$

Figure 2:
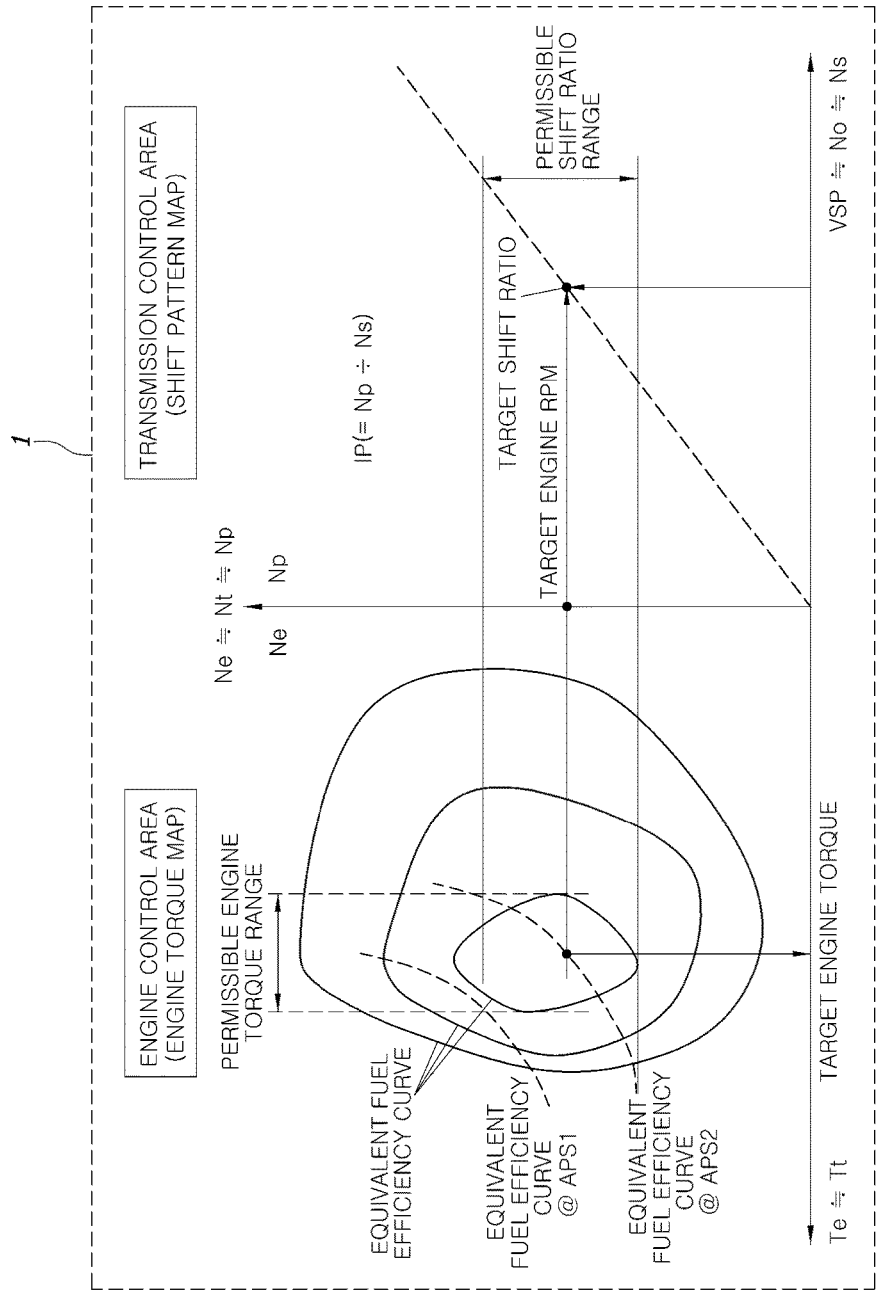
FIG. 2 is a diagram illustrating a method of determining a target engine operating point and a target shift ratio.

Based on these control correlation factors, an engine control area (engine torque map) and a transmission control area (shift pattern map) may be expressed together in an integrated control map, as illustrated in FIG. 2.

Here, the engine RPM (Ne) and the driving-shaft pulley RPM (Np) may be set on a Y-axis. The engine control area may be expressed on a left side of the Y-axis, while the transmission control area may be expressed on a right side of the Y-axis.

In addition, the engine torque (Te) and the turbine torque (Tt) are defined as having approximate values as follows:

$$Te \approx Tt$$

Here, the engine torque (Te) and the turbine torque (Tt) may be set on an X-axis of the integrated control map. Thereby, the engine control area may be expressed on the integrated control map through a relationship between the engine torque (Te) and the engine RPM (Ne).

Further, a vehicle speed (VSP), an output-shaft RPM (No), and a driven-shaft pulley RPM (Ns) are defined as having approximate values as follows:

$$VSP \approx No \approx Ns$$

In other words, the vehicle speed (VSP), the output-shaft RPM (No), and the driven-shaft pulley RPM (Ns) may be set on the X-axis of the integrated control map. Thus, the transmission control area may be expressed on the integrated control map through a relationship between the vehicle speed (VSP) and the driven-shaft pulley RPM (Ns).

Based on the control correlation factors, the integrated control method for the engine and the transmission according to the present disclosure may include a required-power calculation step, an engine-operating-point calculation step, a shift-ratio calculation step and an integrated control step.

The steps will be described in detail with reference to FIGS. 1 and 2. At the required-power calculation step, a control unit 1 may calculate the required power of the vehicle, based on factors reflecting the driving state of the vehicle.

In this regard, the factors reflecting the driving state of the vehicle may include a vehicle speed, a gradient, and an APS opening amount. Particularly, the required power may be calculated by determining a driver's intention to accelerate based on the APS opening amount. The power required for the vehicle may be calibrated taking into account a current vehicle speed and gradient, and then calculated.

That is, the power required for the vehicle may be calculated by multiplying the engine RPM (Ne) and the engine torque (Te). The required power may be determined on an equivalent power curve, which is determined according to a level of the APS opening amount.

$$Power\ (P) = Ne \times Te$$

Next, at the engine-operating-point calculation step, the control unit 1 may determine an engine operating point by calculating the target engine torque and the target engine RPM which are needed to output the required power corresponding to a driver's intention to accelerate.

That is, if the driver's intention to accelerate is relatively large, it is interpreted as being focused on acceleration driving rather than fuel-saving driving. For example, under the assumption that the required power is not changed, the engine operating point is moved in a direction in which the engine RPM (Ne) is decreased while the engine torque (Te) is increased, on the equivalent power curve for outputting the required power.

In contrast, if the driver's intention to accelerate is relatively small, a driving focuses on the fuel-saving driving. Likewise, the engine operating point is moved in a direction in which the engine RPM (Ne) is increased while the engine torque (Te) is decreased, on the equivalent power curve for outputting the required power.

Here, even if the required power when the driver's intention to accelerate is relatively large is the same as the required power when the driver's intention to accelerate is relatively small, the target engine torque and the target engine RPM are changed depending on a change rate of the APS opening amount (the driver's intention to accelerate). Consequently, the target engine operating point is also changed.

However, since it is preferable to take into account the fuel efficiency in any driving condition such as the acceleration driving or the fuel-saving driving, a position of the engine operating point may be determined to match or be similar to a point at which an associated equivalent power curve crosses an equivalent fuel efficiency curve.

Further, at the shift-ratio calculation step, the control unit 1 may calculate a target shift ratio (IP) based on a relationship between the target engine RPM and the vehicle speed (VSP).

For example, after a target engine control point is determined by calculating the target engine torque and the target engine RPM, as described in a section for the control correlation, the driving-shaft pulley RPM (Np) is determined with a value that is approximate to the target engine RPM, and the driven-shaft pulley RPM (Ns) is determined with a value that is approximate to a current vehicle speed (VSP).

Thus, the target shift ratio (IP) may be determined based on the relationship between the driving-shaft pulley RPM (Np) and the driven-shaft pulley RPM (Ns) as follows:

$$\text{target shift ratio } (IP\text{:shift pulley ratio}) = Np \div Ns$$

Next, at the integrated control step, the control unit 1 may control the engine and the transmission such that a current engine torque (Te), a current engine RPM (Ne), and a current shift ratio come close to the target engine torque, the target engine RPM, and the target shift ratio (IP). Thereby, it is possible to control the driving of the vehicle.

Such a configuration of the present disclosure determines the target engine operating point in the integrated control map (i.e., the map having the engine control area and the transmission control area) based on the driving state of the vehicle and the driver's intention to accelerate, and calculates the target shift ratio (IP) based on the target engine operating point, thus being capable of significantly saving the man-hour required to set the map as compared to the conventional control method in which the engine torque map and the shift pattern map are individually set, and improving fuel efficiency as compared to the conventional control method.

Moreover, the present disclosure strategizes on the control method of implementing target required power according to the driver's intention to accelerate, thus allowing the vehicle to be controlled in various driving modes and thereby giving an effective driving quality to the driver.

Meanwhile, as illustrated in FIG. 2, at the engine-operating-point calculation step of the present disclosure, a permissible engine torque range may be determined by obtaining a minimum value and a maximum value for the engine torque (Te) that may output the required power, on the equivalent power curve determined according to the driver's intention to accelerate, and the target engine torque may be determined depending on a driver's acceleration level within a range of the permissible engine torque.

That is, as for the engine mounted on the vehicle, the range of the permissible engine torque may be determined in view of the intrinsic performance of the engine, the protection control of the engine and other engine control strategies. Thus, it is desired to determine the target engine torque within the range of the permissible engine torque.

In addition, at the shift-ratio calculation step of the present disclosure, a permissible shift-ratio range may be determined by obtaining a minimum value and a maximum value for the engine RPM (Ne) that may output the required power, on the equivalent power curve determined according to the driver's intention to accelerate, and the target engine RPM may be determined within the permissible shift-ratio range.

That is, as for the transmission mounted on the vehicle, the permissible engine RPM may be determined in view of the intrinsic shift performance of the transmission, the protection control of the transmission and other transmission control strategies. Thus, it is desired to determine the target engine RPM within the range of the permissible engine RPM. Thereby, it is possible to determine the target driving-shaft pulley RPM (Np).

Figure 3:
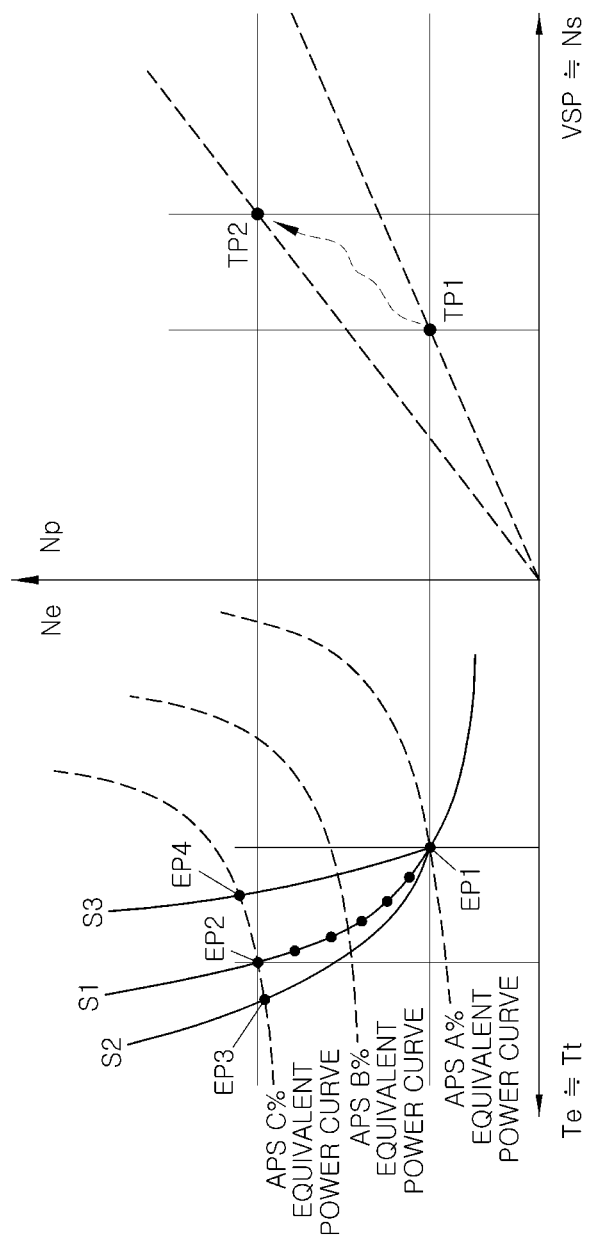
FIG. 3 is a diagram illustrating an operation of determining the target engine operating point and the target shift ratio depending on a change in APS opening amount according to the present disclosure.

Hereinafter, a method of determining the target engine operating point and the target shift ratio (IP) according to a change in APS opening amount will be described with reference to FIG. 3.

When the APS opening amount is A % according to the driver's intention to accelerate, the required power of the vehicle may be calculated based on the driving state of the vehicle, for example, the vehicle speed and the gradient as well as the APS opening amount.

Thereby, the target engine torque and the target engine RPM for outputting the required power may be calculated, and the target engine operating point may be determined as the relationship between the target engine torque and the target engine RPM. This may be a point EP1 indicated in the engine control area.

Subsequently, the target driving-shaft pulley RPM that is the approximate value is calculated by the target engine RPM that has been calculated as described above, and the driven-shaft pulley RPM (Ns) is calculated as a value that is approximate to the current vehicle speed (VSP). Thus, the target shift ratio (IP) may be determined as the relationship between the target driving-shaft pulley RPM and the driven-shaft pulley RPM (Ns). This may be a point TP1 indicated in the transmission control area.

Subsequently, if the APS opening amount increases from A % to C % according to the driver's intention to accelerate, the required power of the vehicle may also be changed depending on a change in APS opening amount.

Thus, the target engine torque and the target engine RPM for outputting the changed required power may be calculated, and the target engine operating point may be determined based on the relationship between the target engine torque and the target engine RPM. This may be a point EP2 indicated in the engine control area.

Thereafter, by calculating the target driving-shaft pulley RPM according to the target engine RPM that has been calculated as such, the target shift ratio (IP) may be determined based on the relationship between the target driving-shaft pulley RPM and the driven-shaft pulley RPM (Ns). This may be a point TP2 indicated in the transmission control area.

This has been described as an example with reference to the driving condition in which the driver's intention focuses on constant-speed driving. The engine operating point may be moved along a path S1.

However, in a condition in which a driver focuses on the acceleration driving, the engine operating point may be moved along a path S2 where the engine torque (Te) is increased more rapidly compared to the constant-driving condition. That is, the engine operating point may move from point EP1 to point EP3.

Further, in a condition in which a driver focuses on the fuel-saving driving, the engine operating point may be moved along a path S3 where the engine torque (Te) is increased more slowly compared to the constant-driving condition. That is, the engine operating point may move from point EP1 to point EP4.

However, although the target shift ratios (IP) corresponding to points EP3 and EP4 are not shown in the drawings, the target shift ratio may also be changed in response to a changed engine operating point if the engine operating point moves from point EP3 to point EP4.

As having described above, the present disclosure provides an integrated control method for an engine and a transmission, which determines a target engine operating point in an integrated control map having an engine control area and a transmission control area, reflecting a driving state of a vehicle and a driver's intention to accelerate. The integrated control method calculates a target shift ratio based on the target engine operating point, thus being capable of significantly saving a man-hour required to set a map as compared to a conventional control method in which an engine torque map and a shift pattern map are individually set, and improving fuel efficiency as compared to the conventional control method.

Furthermore, the present disclosure provides an integrated control method for an engine and a transmission, which strategizes on a control method of implementing target required power according to a driver's intention to accelerate, thus allowing a vehicle to be controlled in various driving modes and thereby giving an effective driving quality to a driver.

Although exemplary forms of the present disclosure have been described for illustrative purposes, those skilled in the art will appreciate that various modifications, additions and substitutions are possible, without departing from the scope and spirit of the present disclosure.

What is claimed is:

1. An integrated control method for an engine and a transmission, the integrated control method comprising:
    a required-power calculation step of calculating, by a control unit, a required power of a vehicle based on factors reflecting a driving state of the vehicle;
    an engine-operating-point calculation step of calculating, by the control unit, a target engine torque and a target engine revolution per minute (RPM) that are needed to output the required power corresponding to a driver's intention to accelerate;
    a shift-ratio calculation step of calculating, by the control unit, a target shift ratio based on a relationship between the target engine RPM and a vehicle speed; and
    an integrated control step of controlling the engine and the transmission by the control unit such that a current engine torque, a current engine RPM, and a current shift ratio converge to the target engine torque, the target engine RPM, and the target shift ratio, respectively,
    wherein, in the engine-operating-point calculation step, a permissible engine torque range is determined by obtaining a minimum value and a maximum value for the engine torque that output the required power, on an equivalent power curve determined based on the driver's intention to accelerate, and
    wherein the target engine torque is determined within the permissible engine torque range based on a driver's acceleration level.

2. The integrated control method according to claim 1, wherein the factors reflecting the driving state of the vehicle comprise the vehicle speed, a gradient, and an accelerator position sensor (APS) opening amount.

3. The integrated control method according to claim 1, wherein, in the shift-ratio calculation step, an engine torque map is configured to establish a relationship between an engine RPM and an engine torque, and a shift pattern map is configured to establish a relationship between a RPM of a driving shaft pulley and a RPM of a driven shaft pulley,
    wherein the RPM of the driving shaft pulley is defined as an approximate value of the engine RPM for the engine torque map and the shift pattern map, and
    wherein the RPM of the driven shaft pulley is defined as an approximate value of the vehicle speed, so that the target shift ratio is determined based on the relationship between the RPM of the driving shaft pulley and the RPM of the driven shaft pulley.

4. The integrated control method according to claim 3, wherein, in the shift-ratio calculation step, a permissible shift ratio range is determined by obtaining a minimum value and a maximum value for the engine RPM that output the required power, on the equivalent power curve, and
    the target engine RPM is determined within a range of the permissible shift ratio.

* * * * *